US012123220B2

(12) United States Patent
Xiang et al.

(10) Patent No.: US 12,123,220 B2
(45) Date of Patent: Oct. 22, 2024

(54) LOCK MECHANISM WITH STATE INDICATION FUNCTION

(71) Applicant: WENZHOU YEEKA LOCK TECHNOLOGY CO., LTD., Zhejiang (CN)

(72) Inventors: Wenguang Xiang, Zhejiang (CN); Qianxing Li, Zhejiang (CN); Yanyi Zhou, Zhejiang (CN); Fabrice Vitry, Shanghai (CN); Jianju Shao, Zhejiang (CN)

(73) Assignee: WENZHOU YEEKA LOCK TECHNOLOGY CO., LTD., Wenzhou (CN)

( * ) Notice: Subject to any disclaimer, the term of this patent is extended or adjusted under 35 U.S.C. 154(b) by 199 days.

(21) Appl. No.: 17/968,822

(22) Filed: Oct. 19, 2022

(65) Prior Publication Data

US 2023/0132222 A1 Apr. 27, 2023

(30) Foreign Application Priority Data

Oct. 25, 2021 (CN) ......................... 202111241665.8

(51) Int. Cl.
*E05B 41/00* (2006.01)
*E05B 83/22* (2014.01)

(52) U.S. Cl.
CPC .............. *E05B 41/00* (2013.01); *E05B 83/22* (2013.01)

(58) Field of Classification Search
CPC .......... E05B 41/00; E05B 83/22; E05B 1/003; E05B 17/22; E05B 17/226; E05B 39/00
(Continued)

(56) References Cited

U.S. PATENT DOCUMENTS 136,419 A * 3/1873 Craig et al. ............. E05B 75/00 70/17
250,208 A * 11/1881 Craig ...................... E05B 75/00 70/17

(Continued)

FOREIGN PATENT DOCUMENTS

CN 105909064 A * 8/2016
CN 106715811 A * 5/2017 ............. E05B 1/003

(Continued)

OTHER PUBLICATIONS

European search report dated Mar. 23, 2021 for corresponding European Application No. 22203220.3.

*Primary Examiner* — Suzanne L Barrett

(57) ABSTRACT

A lock mechanism with state indication function includes a housing, a cap and an indicator. The indicator includes active and passive indicators arranged circumferentially around a central axis. The active indicator includes a cam matching surface extending circumferentially around the central axis and a stopping end located at an end of the cam matching surface corresponding to the pivoting center of the active indicator. The radial convex portion slides along the cam matching surface to make the active indicator rotate away from the central axis. The radial convex portion pushes the stopping end of the active indicator to make the active indicator rotate to a recovery position in which the indicating portion is covered by the cap. The passive indicator is in linkage connection with the active indicator through a gear transmission device, making the passive indicator be unfolded and folded synchronously along with the active indicator.

5 Claims, 8 Drawing Sheets

(58) Field of Classification Search
USPC .............................................................. 70/91
See application file for complete search history.

(56) References Cited

U.S. PATENT DOCUMENTS

| | | | | | |
|---|---|---|---|---|---|
| 2,793,522 | A * | 5/1957 | Tornoe | E05B 41/00 | 70/438 |
| 4,490,999 | A * | 1/1985 | Castle | E05B 41/00 | 70/330 |
| 5,133,265 | A * | 7/1992 | Lahti | E05B 41/00 | 105/127 |
| 2011/0016938 | A1* | 1/2011 | Chi | E05B 65/0035 | 70/432 |
| 2018/0209185 | A1* | 7/2018 | Long | B64D 11/02 | |
| 2019/0145130 | A1* | 5/2019 | Affan | E05B 47/026 | 292/144 |
| 2020/0109578 | A1* | 4/2020 | Lunday | E05B 55/005 | |
| 2021/0148136 | A1 | 5/2021 | Kim et al. | | |
| 2021/0230903 | A1* | 7/2021 | Fournier | E05B 17/226 | |

FOREIGN PATENT DOCUMENTS

| | | | | |
|---|---|---|---|---|
| DE | 202014104058 | U1 * | 10/2014 | E05B 41/00 |
| EP | 2752537 | A2 * | 7/2014 | E05B 13/004 |
| GB | 2319287 | A * | 5/1998 | E05B 13/106 |
| WO | WO 2017/124121 | A1 | 7/2017 | |

* cited by examiner

LOCK MECHANISM WITH STATE INDICATION FUNCTION

CROSS-REFERENCE TO RELATED APPLICATIONS

The present application claims priority of Chinese Patent Application No. 202111241665.8, filed on Oct. 25, 2021, the entire contents of which are hereby incorporated by reference.

TECHNICAL FIELD

The present application relates to the technical field of lock mechanisms, and in particular to a lock mechanism being capable of indicating the state thereof.

BACKGROUND

In some applications, it is desirable to know whether the mechanism is latched or unlatched. For example, a lock for fixing a door of a compartment of a long-distance bus or train can be checked before starting a journey. If the lock is not latched properly, luggage belonging to the passengers may be lost accidentally if the door of the compartment is opened during transportation; or, if the storage compartment is not fixed properly and left unattended, luggage may be stolen during the journey.

In order to solve the above problems, a lock mechanism with state indication function has been designed and applied. For example, the latch mechanism with status indicator disclosed in Chinese patent application No. CN 201780000951.0, applied by Southco Inc., has a cap which may be mounted for rotational movement relative to a housing about the central axis thereof between a latched position and an unlatched position, and an indicator which may be interposed between the cap and the housing.

For ease of use, in practical applications, there are generally two indicators which are arranged symmetrically, and the cap is in covering relationship to the indicators. The indicators are mounted on the cap and rotate along with the cap, and guiding structures (i.e., grooves 46 in the specification) are provided in the housing. Along with the rotation of the cap, the indicators are guided by the guiding structures to unfold to at least partly extend beyond the covered position of the cap and fold to the covered state, thereby achieving the function of status indication.

In this solution, for ensuring the stable operation of the indicators, the manufacturing process and corresponding assembly of the parts driven by the guiding grooves under the design of the groove guiding structures are relatively complex. In the specification, an installation structure in which the indicators are pivotally mounted on the housing and do not rotate with the cap is disclosed in the second embodiment, but there is a limitation in the rotation angle of the lock or/and poor stability of the indicator structure.

SUMMARY

An object of the present invention is to provide a lock mechanism with state indication function, which is simple in structure, convenient in assembly and stable in structure, in order to overcome the problems of the prior art.

To achieve the above object, the present invention provides the following technical solutions:

A lock mechanism with state indication function includes a housing, a cap and an indicator, the cap having a central axis and being mounted for rotational movement relative to the housing about the central axis between a latched position and an unlatched position, the cap including a radial convex portion which extends radially and rotates along with the cap about the central axis;

the indicator being interposed between the cap and the housing, and including an indicating portion which is in covering relationship to the cap, the indicator being pivotally mounted on the housing about a projection, the indicator moving radially and outwardly with respect to the cap from the central axis when the cap rotates from the latched position to the unlatched position, making the indicating portion of the indicator no longer in covering relationship to the cap;

wherein the indicator includes an active indicator and a passive indicator arranged circumferentially around the central axis, the active indicator includes a cam matching surface extending circumferentially around the central axis and a stopping end located at an end of the cam matching surface corresponding to the pivoting center of the active indicator;

the radial convex portion slides along the cam matching surface to make the active indicator rotate about the projection to move away from the central axis of the cap;

the radial convex portion pushes the stopping end of the active indicator to make the active indicator rotate about the projection to a recovery position in which the indicating portion is covered by the cap; and the passive indicator is linked with the active indicator through a gear transmission device, making the passive indicator be unfolded and folded synchronously along with the active indicator.

By adopting the above technical solution, when the cap rotates from the latched position to the unlatched position, the radial convex portion slides along the cam matching surface of the active indicator to make the active indicator rotate about the projection to move away from the central axis of the cap, thereby the indicating portion gradually extends out and is no longer in covering relationship to the cap. At the same time, the active indicator drives the passive indicator to act synchronously through the gear transmission device, realizing synchronous unfolding of the passive indicator and active indicator, and obtaining reliable indication. By means of adopting the matched radial convex portion and the cam mating surface and stopping end of the active indicator, driving the indicator to unfold or fold accurately and smoothly is achieved while keeping the structure simple, the manufacturing easier with higher convenience for assembly and operation. Furthermore, the indicator is designed to adopt an active indicator and a passive indicator which are in linkage connection through a gear transmission drive, and due to its stable and reliable structure, it can provide precise and reliable indication and prevent the structure from loosening over time.

In some embodiments, both the passive indicator and active indicator extend circumferentially around the central axis, a far end of the passive indicator rotating around the pivoting center of the passive indicator and a far end of the active indicator rotating around the pivoting center of the active indicator are adjacent to each other; when the cap rotates from the latched position to the unlatched position, the radial convex portion is capable of sliding out of the active indicator cam matching surface to a position where the passive indicator is located; the passive indicator includes a relief surface extending circumferentially around the central axis, the relief surface is configured to provide a continuity for the radial convex portion to slide along when the cap rotation has exceeded a certain angle, for example beyond 90 degrees, and when the convex portion is no longer in contact with the cam matching surface of the active indicator. The passive indicator relief surface cooperates with the radial convex portion correspondingly to maintain the passive indicator at an unfolded position, in a state defined as rotated pivotally about the projection with a certain angle, moved away from the central axis of the cap and abutted against the convex portion.

With such structural design, the passive indicator may be configured to form a relief surface which cooperates with and link up the cam mating surface of the active indicator, allowing the radial convex portion to slide out of the active indicator and into the passive indicator in a position where the passive indicator is located, and vice versa. The radial convex portion may rotate away from the active indicator to reach a position where the passive indicator is located, enlarging a range of the rotation angle of the cap from the latched position to the unlatched position, and achieving a more flexible angle design. This is especially important when the cap requires a rotation greater than 90 degrees to go from a latched position, for example 0 degrees, to an unlatched position, for example 180 degrees rotation. While the relief surface of the passive indicator is limited by the abutting against the radial convex portion, the gear mechanism ensures that both the active indicator and passive indicator are always in the unfolded state when the cap is in the unlatched position.

In some embodiments, an end of the relief surface of the passive indicator adjacent to the pivoting center of the passive indicator is connected to a stop portion, and the stop portion abuts the radial convex portion to form a limit defining the limit position of the cap in the unlocking direction.

With such structural design, position limitation of the cap is achieved by the limiting of the passive indicator, which is simple in structure and reliable in cooperation.

In some embodiments, an end of the passive indicator with the pivoting projection thereof is close to an end of the active indicator with the pivoting projection thereof, the gear transmission drive includes first meshing teeth which are formed on the active indicator and rotate about the pivoting center of the active indicator and second meshing teeth which are formed on the passive indicator and rotate about the pivoting center of the passive indicator, and the first meshing teeth are meshed with the second meshing teeth for power transmission.

With such structural design, the transmission structure is simple, and the assembly and operation are stable and reliable.

In some embodiments, the housing includes a disc-shaped top portion and defines a positioning shaft hole which extends through the disc-shaped top portion; the cap includes a shielding ring facing to the disc-shaped top portion and a shaft extending axially from the shielding ring; the cap is positioned in the positioning shaft hole by the shaft, the shielding ring and the disc-shaped top portion define a space for receiving the indicator, and the radial convex portion is mounted in the space.

With such structural design, the matching structure of the housing and cap is simple, which is convenient for the insertion and installation of the indicator, and the overall structure is simple and compact.

The present invention will be further described below in combination with the drawings.

BRIEF DESCRIPTION OF THE DRAWINGS

In order to illustrate technical solutions of embodiments of the present application more clearly, drawings that need to be used in the description of the embodiments will be briefly described below. It is obvious that the drawings described below are only some embodiments of the present application, and other drawings may be obtained from the drawings without any creative work to those skilled in the art, which should be in the scope of this application. In the following description, the same reference numerals refer to the same members.

DESCRIPTION OF THE EMBODIMENTS

Figure 1:
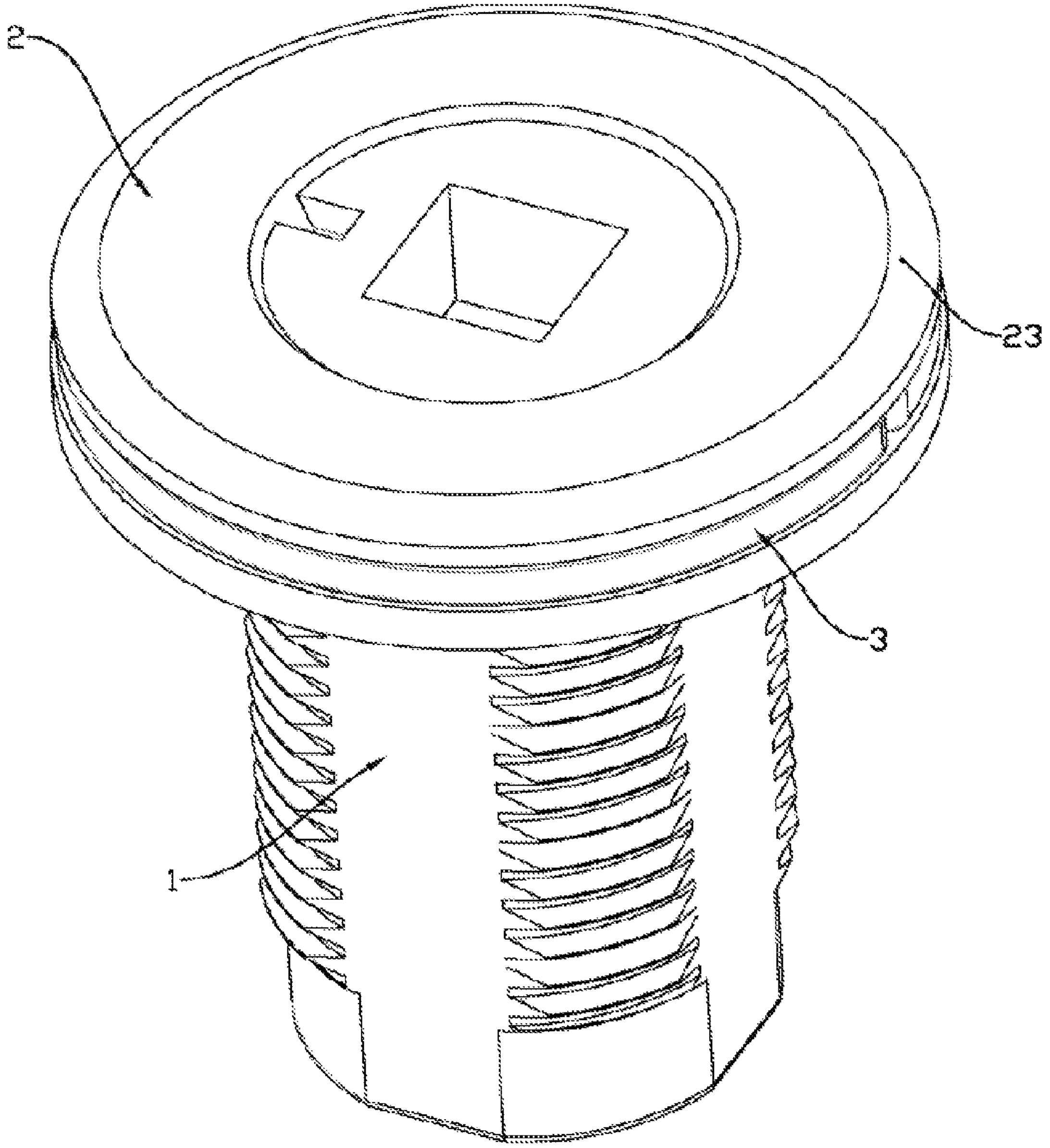
FIG. 1 is a schematic view of a lock mechanism according to an embodiment of the present invention, wherein the lock mechanism is in a latched state.
Figure 2:
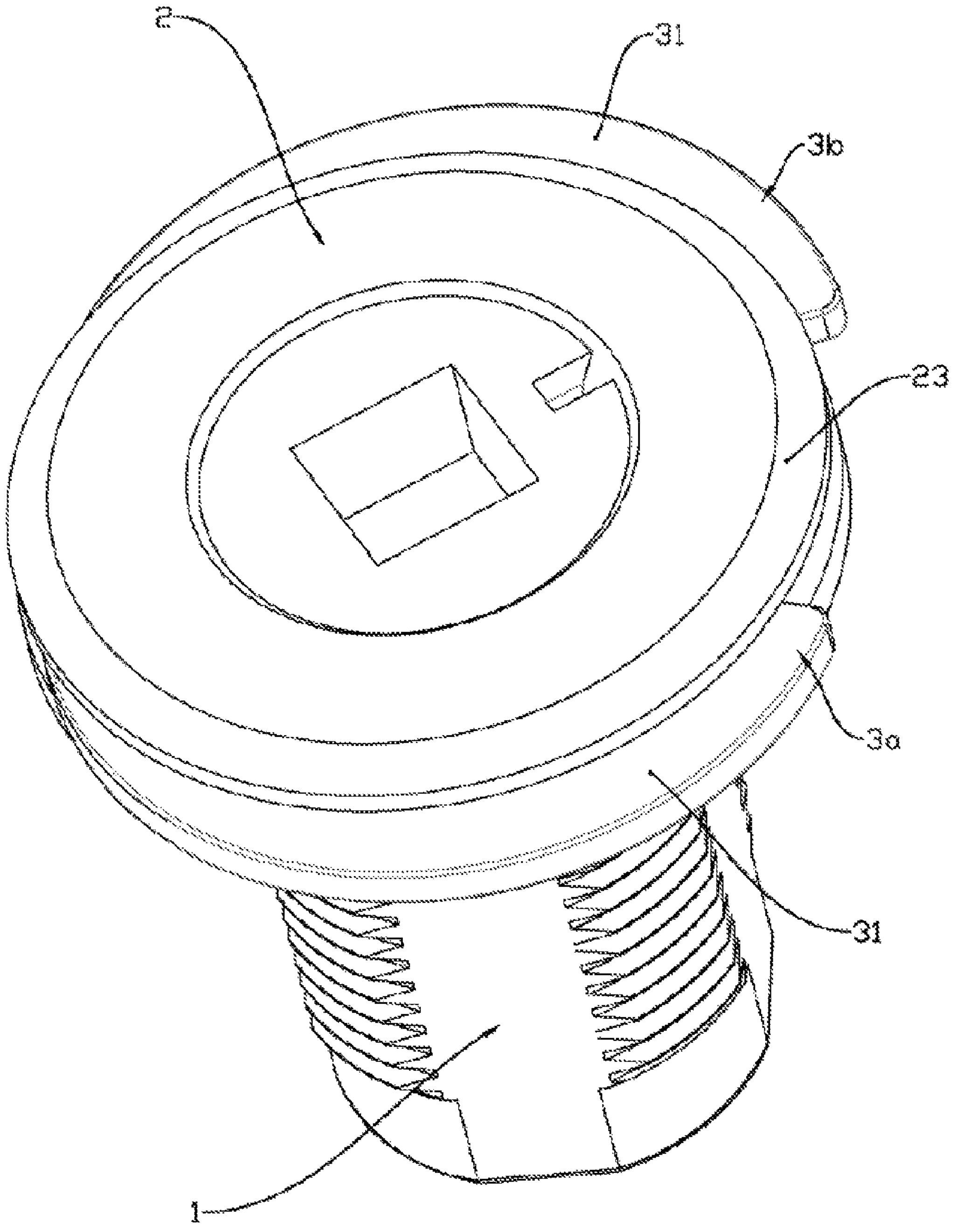
FIG. 2 is a schematic view of the lock mechanism according to the embodiment of the present invention, wherein the lock mechanism is in an unlatched state.
Figure 3:
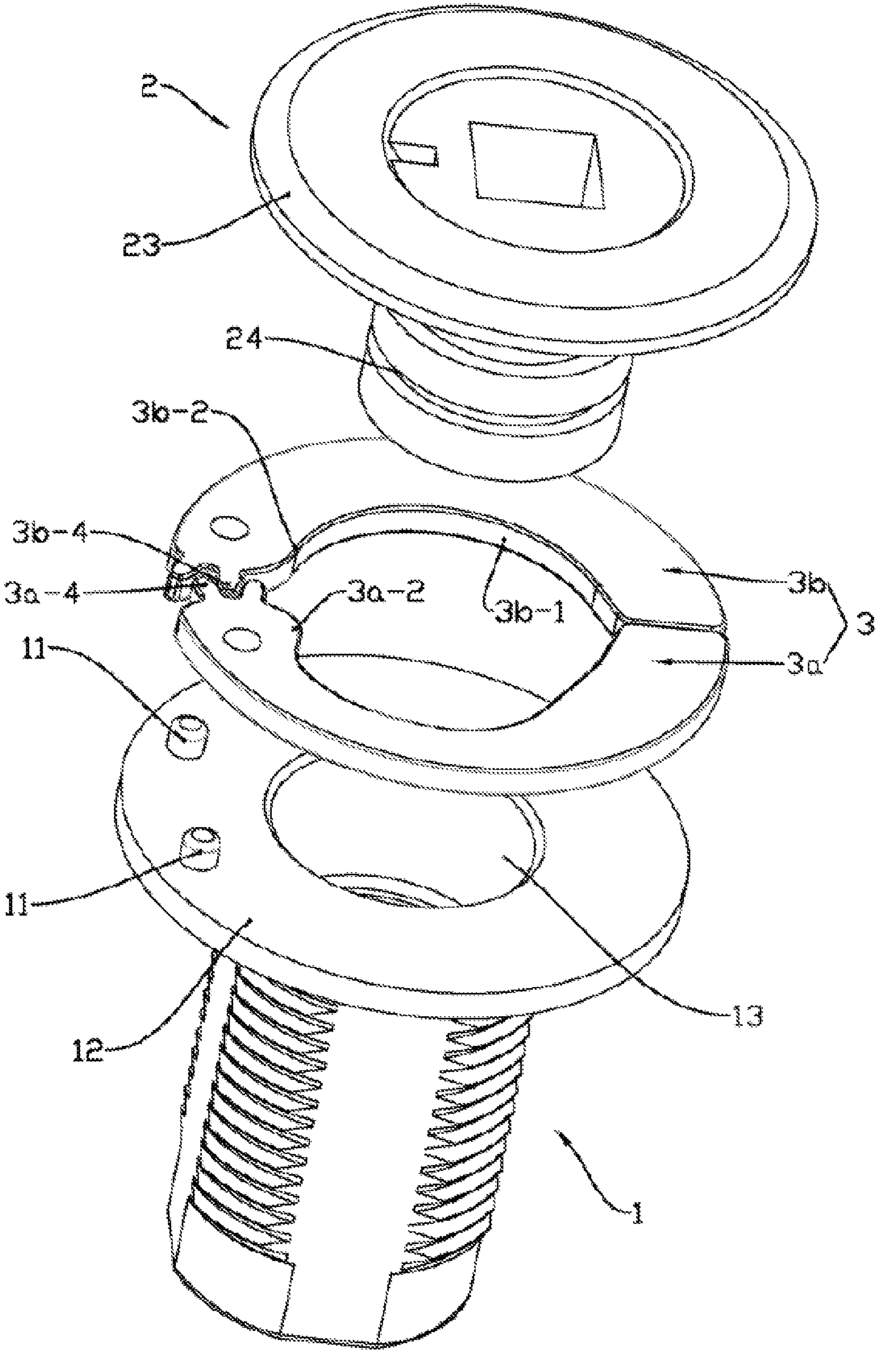
FIG. 3 is an exploded view of the lock mechanism according to the embodiment of the present invention.
Figure 4:
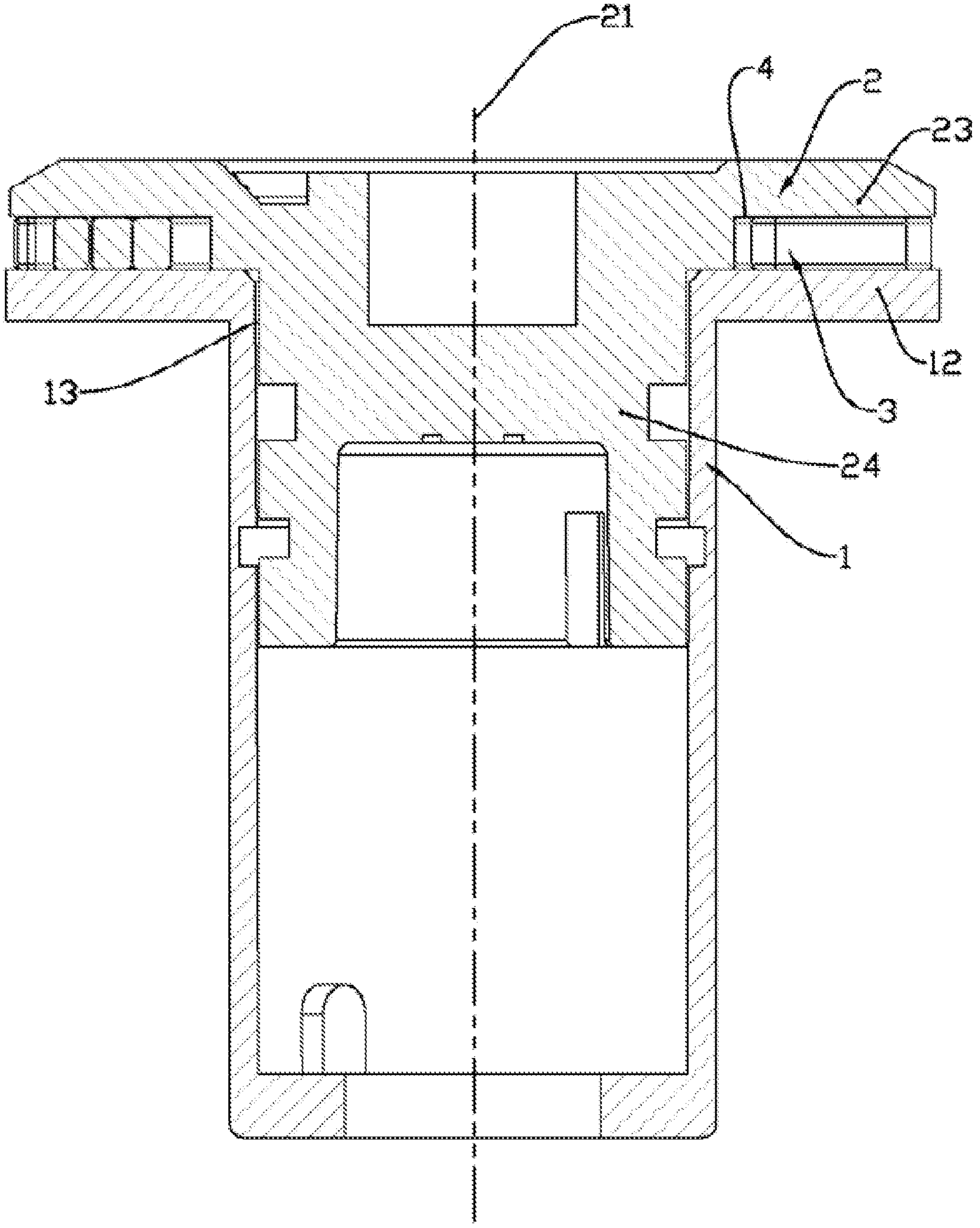
FIG. 4 is an axial cross-sectional view of the lock mechanism according to the embodiment of the present invention.

For better illustrating the technical means, creative features, objects and effects of the present application, detailed description will be given for the embodiments provided by the present application with reference to the append drawings. Obviously, the described embodiments are only a part of the embodiments, and not all of the embodiments of the present application. Based on the embodiments of the present application, all other embodiments obtained by those skilled in the art without any creative work should be in the scope of this application.

Referring to FIGS. 1-8, the present invention discloses a lock mechanism with state indication function, which includes a housing 1, a cap 2 and an indicator 3. The cap 2 has a central axis 21, and is mounted for rotational movement relative to the housing 1 about the central axis 21 between a latched position and an unlatched position. The indicator 3 is interposed between the cap 2 and the housing 1. The indicator 3 includes an indicating portion 31 which is in covering relationship to the cap 2. The indicator 3 is pivotally mounted on the housing 1 about a projection 11. When the cap 2 rotates from the latched position to the unlatched position, the indicator 3 moves radially and outwardly with respect to the cap 2 away from the central axis 21, so that the indicating portion 31 of the indicator 3 is no longer in covering relationship to the cap 2.

The cap 2 acts corresponding to the unlatching action and latching action of the lock mechanism. When the cap 2 rotates from the latched position to the unlatched position, it drives the indicator 3 to rotate about the projection 11. The projection 11 may be a pin-shaped structure integrally formed on the housing 1 (which is preferably adopted in this embodiment for facilitating molding and installation), or a pin assembled onto the housing, or a pin-shaped structure integrally formed on the indicator 3. When the indicator 3 is unfolded, the indicating portion 31 is no longer covered by the cap 2. The cap 2 includes a radial convex portion 22, which extends radially and rotates along with the cap 2 about the central axis 21.

Figure 5:
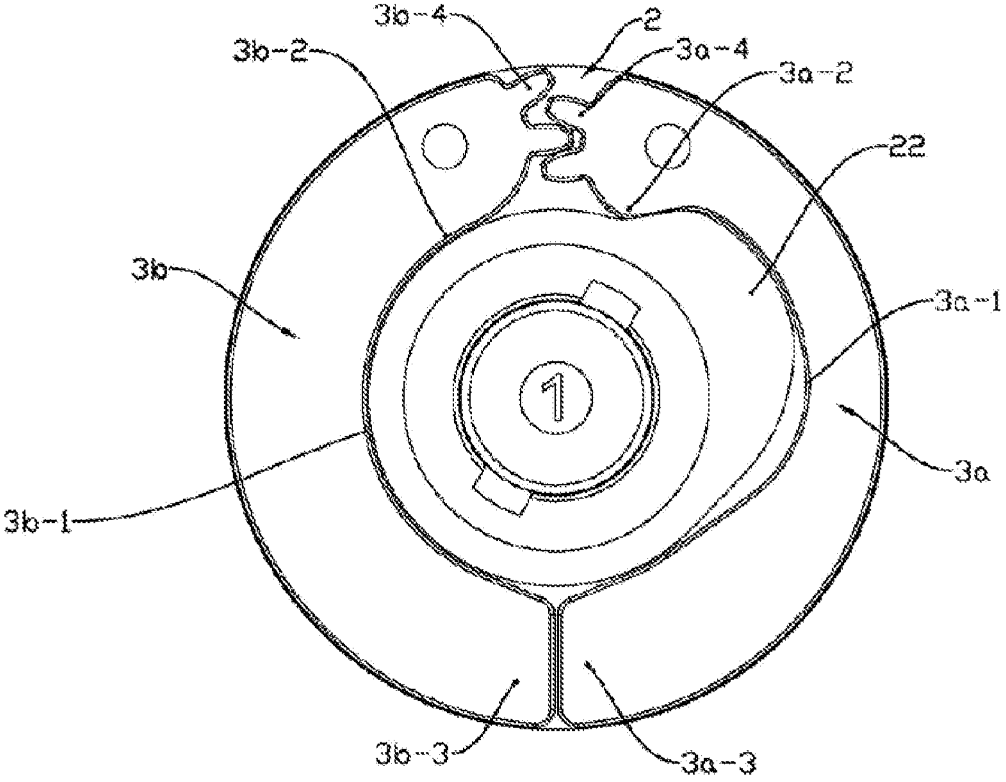
FIG. 5 shows a state of a radial convex portion of a cap and an indicator when the indicator according to the embodiment of the present invention is fully folded.
Figure 6:
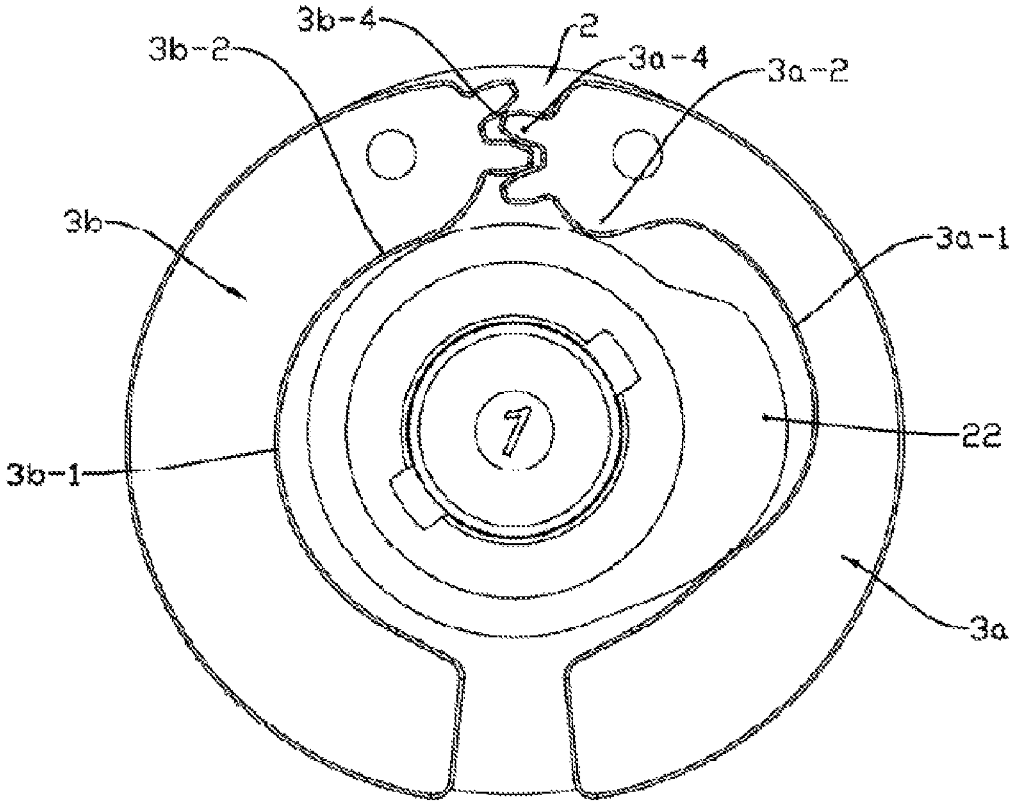
FIG. 6 shows a state of the radial convex portion of the cap and the indicator after the cap has rotated a certain angle, driving the indicator from a fully folded state to an initial unfolding state.
Figure 7:
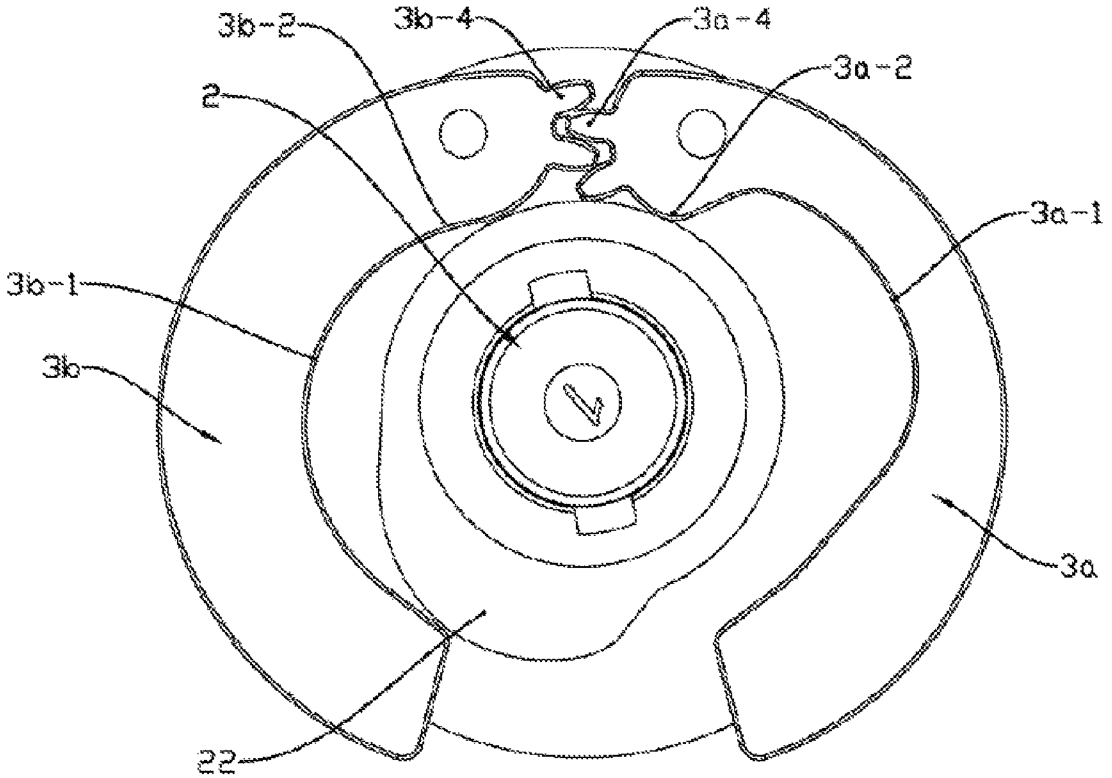
FIG. 7 shows a state of the radial convex portion entering a passive indicator when the indicator according to the embodiment of the present invention is unfolded.
Figure 8:
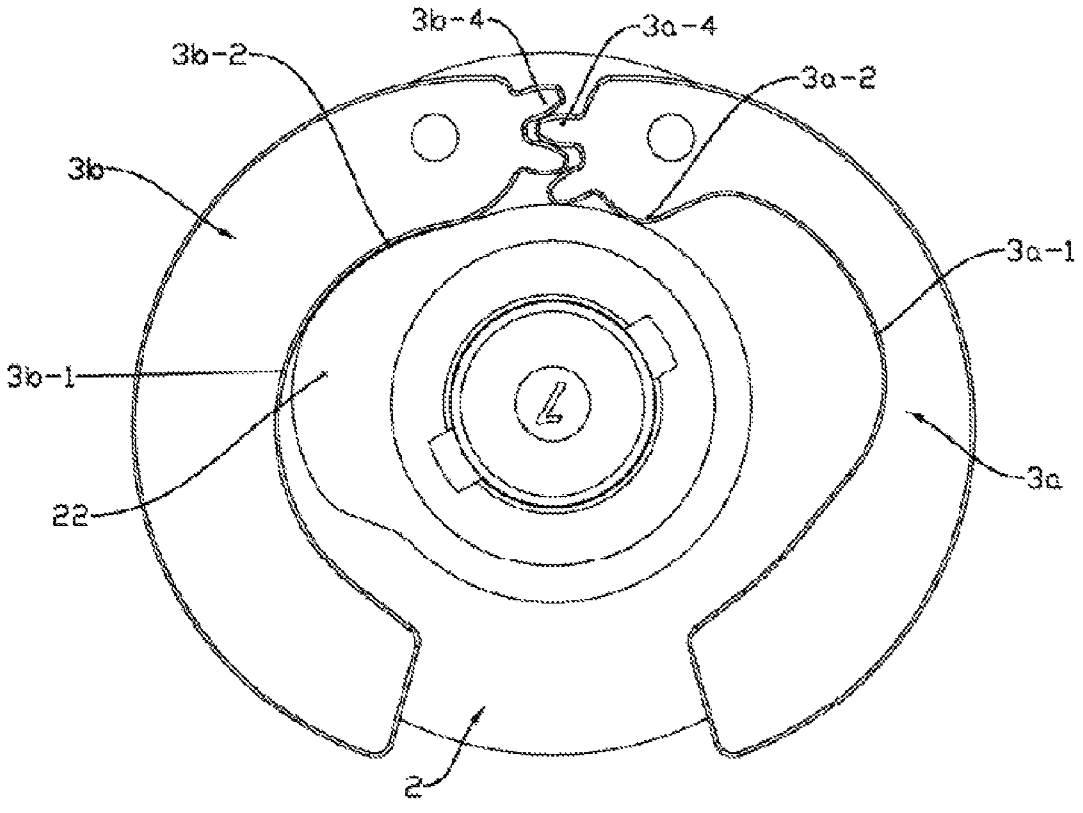
FIG. 8 shows a state of the radial convex portion of the cap and the indicator when the lock mechanism according to the embodiment of the present invention is unlatched.

The indicator 3 includes an active indicator 3*a* and a passive indicator 3*b* arranged circumferentially around the central axis 21. The active indicator 3*a* includes a cam matching surface 3*a*-1 extending circumferentially around the central axis 21 and a stopping end 3*a*-2 located at an end of the cam matching surface 3*a*-1 corresponding to a pivoting center of the active indicator 3*a*. The radial convex portion 22 slides along the cam matching surface 3*a*-1 to make the active indicator 3*a* rotate about the projection 11 to move away from the central axis 21 of the cap 2. The radial convex portion 22 pushes the stopping end 3*a*-2 of the active indicator 3*a* and makes the active indicator 3*a* rotate about the projection 11 to a recovery position in which the indicating portion 31 is covered by the cap 2 (as shown in FIG. 5). The passive indicator 3*b* is in linkage connection with the active indicator 3*a* through a gear transmission device, which makes the passive indicator 3*b* be unfolded and folded synchronously along with the active indicator 3*a*.

Referring to FIGS. 5-8, when the cap 2 rotates from the latched position to the unlatched position, the radial convex portion 22 slides along the cam matching surface 3*a*-1 of the active indicator 3*a* to make the active indicator 3*a* rotate about the projection 11 to move away from the central axis 21 of the cap 2, thereby the indicating portion 31 gradually extends out and is no longer in covering relationship to the cap 2. At the same time, the active indicator 3*a* drives the passive indicator 3*b* to act synchronously through the gear transmission device, realizing synchronous unfolding of the passive indicator 3*b* and active indicator 3*a*, and obtaining reliable indication. When the cap 2 rotates reversely, the passive indicator 3*b* and active indicator 3*a* may be folded synchronously.

When the active indicator 3*a* and passive indicator 3*b* are unfolded initially, the rotation angle of the cap 2 in the unlocking direction may be adjusted as required. For example, the indicator 3 may be driven to rotate and unfold when the cap 2 starts to rotate along the unlocking direction; or, the indicator 3 may be driven to rotate and unfold after the cap 2 rotates for a certain angle, such as 15° (as shown in FIGS. 5-8). From the initial unfolding to the fully unfolding of the active indicator 3*a*, the rotation angle of the cap 2 in the unlocking direction may be adjusted as required too.

By means of adopting the matched radial convex portion 22 and the cam mating surface 3*a*-1 and stopping end 3*a*-2 of the active indicator 3*a*, driving the indicator 3 to accurately and smoothly unfold or fold is achieved while keeping the structure simple, the manufacturing easier with higher convenience for assembly and operation. Furthermore, the indicator 3 is designed to adopt an active indicator 3*a* and a passive indicator 3*b* which are in linkage connection through a gear transmission drive, and due to its stable and reliable structure, it can provide precise and reliable indication and prevent the structure from loosening over time.

As disclosed in the prior art, the cap may be configured to receive a driver to drive the cap from the latched position to the unlatched position. The driver is used to actuate the lock mechanism between the latched state and unlatched state. The radial convex portion 22 is preferably configured in a cam shape with a curved transition between the radial convex portion and the base circle.

The passive indicator 3*b* and the active indicator 3*a* both extend circumferentially around the central axis 21. A far end 3*b*-3 of the passive indicator 3*b* rotating around the pivoting center of the passive indicator 3*b* and a far end 3*a*-3 of the active indicator 3*a* rotating around the pivoting center of the active indicator 3*a* are adjacent to each other, and in the unfolded position these surfaces will move away from each over, and become the most visible part of the indicator, due to the long distance to the pivoting centers. The passive indicator 3*b* includes a relief surface 3*b*-1 extending circumferentially around the central axis 21, and the relief surface 3*b*-1 can support the radial convex portion 22 after the radial convex portion 22 slides along the cam matching surface 3*a*-1 and disengage from the active indicator, enabling a continuity of cam matching surface as the cap continue its rotation towards the unlatched position.

When the cap 2 rotates from the latched position to the unlocked position, the radial convex portion 22 may slide out of the cam matching surface 3*a*-1 and reach a position where the relief surface 3*b*-1 of the passive indicator 3*b* is located. The relief surface 3*b*-1 cooperates with the radial convex portion 22 correspondingly to maintain the passive indicator 3*b* at an unfolded position, in a state defined as rotated pivotally about the projection 11 with a certain angle, moved away from the central axis 21 of the cap 2 and abutted against the radial convex portion 22.

The passive indicator may be configured to form a relief surface which cooperates with and link up the cam mating surface of the active indicator, allowing the radial convex portion to slide out of the active indicator and into the passive indicator in a position where the passive indicator is located, and vice versa. The radial convex portion may rotate away from the active indicator to reach a position where the passive indicator is located, enlarging a range of the rotation angle of the cap from the latched position to the unlatched position, and achieving a more flexible angle design. This is especially important when the cap requires a rotation greater than 90 degrees to go from a latched position, for example 0 degrees, to an unlatched position, for example 180 degrees rotation. While the relief surface of the passive indicator is limited by the abutting against the radial convex portion, the gear mechanism ensures that both the active indicator and passive indicator are always in the unfolded state when the cap is in the unlatched position.

The limit position of the cap rotating along the unlocking direction needs to be limited, to achieve a limitation of the rotation angle for the unlatching action of the locking mechanism. The present invention mainly defines the limit position of the cap in the unlocking direction, and the limit angle of the rotating cap can be limited by an external limit structure. To facilitate the implementation of the limitation, an end of the relief surface 3*b*-1 of the passive indicator 3*b* adjacent to the pivoting center of the passive indicator 3*b* is connected to a stop portion 3*b*-2. The stop portion 3*b*-2 abuts the radial convex portion 22 to form the limitation to the limit position of the cap 2 in the unlocking direction. Position limitation of the cap is achieved by the limiting feature on the passive indicator, which is simple in structure, reliable and accurate.

An end of the passive indicator 3*b* with the pivoting projection thereof is close to an end of the active indicator 3*a* with the pivoting projection thereof. The gear transmission drive includes first meshing teeth 3*a*-4 which are formed on the active indicator 3*a* and rotate about the pivoting center of the active indicator 3*a* and second meshing teeth 3*b*-4 which are formed on the passive indicator 3*b* and rotate about the pivoting center of the passive indicator 3*b*. The first meshing teeth 3*a*-4 are meshed with the second meshing teeth 3*b*-4 for power transmission. The transmission structure is simple, and the assembly and operation are stable and reliable. Furthermore, without considering the transmission distance, the combination of multiple gears may be used to achieve the linkage between the active indicator and the passive indicator.

According to the present invention and in combination with the prior art, the lock mechanism may be provided as various types of latches, such as a simple cam latch. The housing 1 includes a disc-shaped top portion 12 and defines a positioning shaft hole 13 extending through the disc-shaped top portion 12. The cap 2 includes a shielding ring 23 facing to the disc-shaped top portion 12 and a shaft 24 extending axially from the shielding ring 23. The cap 2 is positioned in the positioning shaft hole 13 by the shaft 24. The shielding ring 23 and the disc-shaped top portion 12 form a space 4 for receiving the indicator 3 therein. The radial convex portion 22 is formed at an end surface of the shielding ring 23 facing to the space 4, and is mounted in the space 4. The matching structure of the housing and cap is simple, which is convenient for the insertion and installation of the indicator, and the overall structure is simple and compact.

The above merely provides the preferred embodiments of the present disclosure, which is illustrative, rather than restrictive, to the present disclosure. However, it should be understood by those skilled in the art that, many variations, modifications even substitutions that do not depart from the spirit and scope defined by the present disclosure, shall fall into the extent of protection of the present disclosure.

What is claimed is:

1. A lock mechanism with state indication function, comprising a housing, a cap and an indicator, the cap having a central axis and being mounted for rotational movement relative to the housing about the central axis between a latched position and an unlatched position, the cap comprising a radial convex portion which extends radially and rotates along with the cap about the central axis;

the indicator being interposed between the cap and the housing, and comprising an indicating portion which is in covering relationship to the cap, the indicator being pivotally mounted on the housing about a projection, the indicator moving radially and outwardly with respect to the cap from the central axis when the cap rotates from the latched position to the unlatched position, making the indicating portion of the indicator no longer in covering relationship to the cap;

wherein the indicator comprises an active indicator and a passive indicator arranged circumferentially around the central axis, the active indicator comprises a cam matching surface extending circumferentially around the central axis and a stopping end located at an end of the cam matching surface corresponding to the pivoting center of the active indicator;

the radial convex portion slides along the cam matching surface to make the active indicator rotate about the projection to move away from the central axis of the cap;

the radial convex portion pushes the stopping end of the active indicator to make the active indicator rotate about the projection to a recovery position in which the indicating portion is covered by the cap; and the passive indicator is linked with the active indicator through a gear transmission device, making the passive indicator be unfolded and folded synchronously along with the active indicator.

2. The lock mechanism with state indication function according to claim 1, wherein both the passive indicator and active indicator extend circumferentially around the central axis, a far end of the passive indicator rotating around the pivoting center of the passive indicator and a far end of the active indicator rotating around the pivoting center of the active indicator are adjacent to each other;

when the cap rotates from the latched position to the unlatched position, the radial convex portion is capable of sliding out of the cam matching surface of the active indicator to a position where the passive indicator is located, and vice versa;

the passive indicator comprises a relief surface extending circumferentially around the central axis, the relief surface is configured such that after the convex portion has moved to a position where the passive indicator is located, the convex portion slides along the relief surface; and the relief surface cooperates with the radial convex portion correspondingly to maintain the passive indicator at an unfolded position, in a state defined as rotated pivotally about the projection by a certain angle, moved away from the central axis of the cap and abutted against the convex portion.

3. The lock mechanism with state indication function according to claim 2, wherein an end of the relief surface of the passive indicator adjacent to the pivoting center of the passive indicator is connected to a stop portion, and the stop portion abuts the radial convex portion to form a limit defining the limit position of the cap in the unlocking direction.

4. The lock mechanism with state indication function according to claim 2, wherein an end of the passive indicator with the pivoting projection thereof is close to an end of the active indicator with the pivoting projection thereof, the gear transmission drive comprises first meshing teeth which are formed on the active indicator and rotate about the pivoting center of the active indicator and second meshing teeth which are formed on the passive indicator and rotate about the pivoting center of the passive indicator, and the first meshing teeth are meshed with the second meshing teeth for power transmission.

5. The lock mechanism with state indication function according to claim 1, wherein the housing comprises a disc-shaped top portion and defines a positioning shaft hole which extends through the disc-shaped top portion; the cap comprises a shielding ring facing to the disc-shaped top portion and a shaft extending axially from the shielding ring; the cap is positioned in the positioning shaft hole by the shaft, the shielding ring and the disc-shaped top portion define a space for receiving the indicator, and the radial convex portion is mounted in the space.

* * * * *